Patented Dec. 14, 1926.

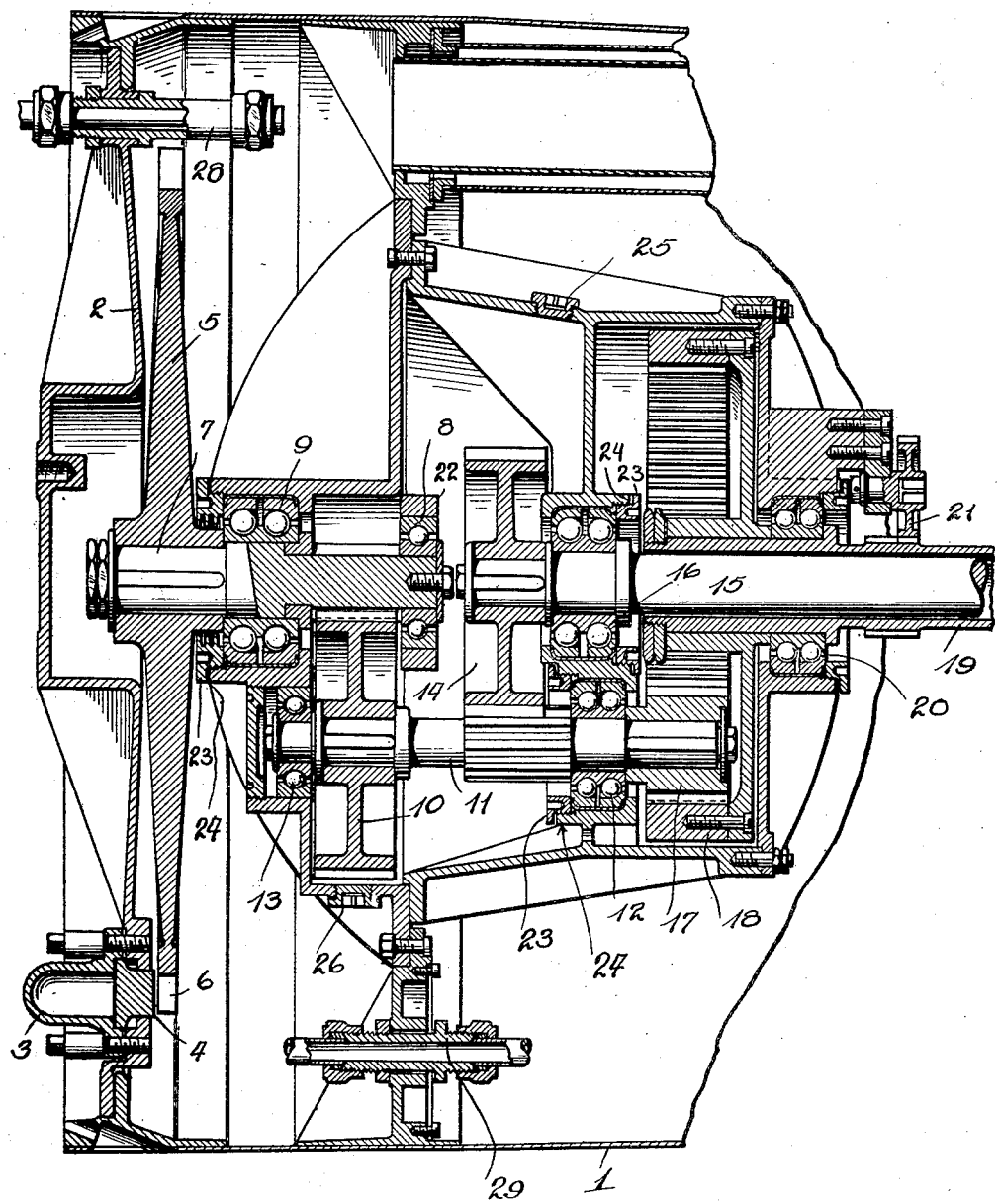

1,610,661

UNITED STATES PATENT OFFICE.

JAMES S. CURRIER, OF NEWPORT, RHODE ISLAND, ASSIGNOR TO THE GOVERNMENT OF THE UNITED STATES.

TORPEDO.

Application filed April 1, 1922. Serial No. 548,825.

This invention relates to improvements in torpedoes and more particularly to the turbine drive mechanism.

Heretofore it has been customary to use two turbines driven in opposite directions by the products of combustion of the combustion flask, these turbines being directly connected with oppositely revolving concentric propeller shafts for rotating twin propellers at the tail of the torpedo.

The present invention is directed to an improvement over this construction in which a suitable high speed turbine wheel is mounted on the lingitudinal axis of the torpedo and provided with intervening reduction gearing for driving the propeller shafts. This construction permits the use of a larger turbine of improved construction and a reduction of associated parts thereby simplifying the construction as a whole and rendering it less expensive to manufacture and install.

A further object is to provide an improved driving mechanism for torpedoes with more reliable and efficient lubricating means and cooling means for the engine thereby reducing the consumption of oil required during the run, the use of oil pumps and the elimination of smoke and gases in the wake of the torpedo.

Other objects will be in part obvious and in part hereinafter pointed out in connection with the accompanying sheet of drawings wherein is illustrated in longitudinal section such parts of the complete driving mechanism and associated elements as may be necessary for one skilled in the art to thoroughly understand the same.

In the drawing 1 indicates the shell of the torpedo enclosing the engine mechanism or turbine wheel and being in direct contact with the water serves to keep the temperature of the engine chamber more or less reduced. This engine casing is closed by a bulkhead 2 which separates the engine from the usual combustion flask and associated parts which supply the products of combustion through a nozzle plate cover 3 to the nozzle 4. A turbine wheel 5 is provided with buckets 6 and is keyed to a shaft 7 which acts as a turbine spindle. This shaft 7 is mounted in two sets of commercial ball bearings 8 and 9, the first being the usual radial bearing while the other is a combined thrust and radial bearing. Teeth or a pinion is directly cut on the after end of the shaft 7 adapted to coact with and drive a larger gear 10 on shaft 11 which shaft is supported on two commercial ball bearings 12 and 13, one being a radial thrust bearing and the other merely a radial bearing. The shaft 11 is preferably provided with gear teeth directly cut thereon adapted to drive a larger gear 14 equal in size to the gear 10. This gear 14 is keyed to an inner propeller shaft 15 and the thrust from this shaft is taken up and supported by a combined radial and thrust ball bearing 16. On the after end of shaft 11 is keyed a pinion 17 adapted to mesh with a large internal gear 18 and drive the same in a direction opposite to that of the turbine wheel thereby helping to balance the gyroscopic effect of the turbine wheel. This gear 18 is mounted on an outer shaft 19 supported in suitable ball bearings 20. A gear 21 meshes with teeth on this shaft 19 for the purpose of driving the standard distance gear and gyro mechanism.

The ball bearings used are preferably of that type approved by manufacturers and if more than one bearing is used on a shaft one only is secured endwise while the other is of the radial type and free to move endwise as is the bearing 22. The thrust bearings are preferably secured by lock nut 23 which in turn is secured by split washers 24.

The upper part of the casing is provided with an oil inlet 25 and at the lower part with a draining cap 26. The casing is partially filled with oil whereby all of the gearing shafts and bearings are thoroughly lubricated by the splash system.

Owing to the large diameter of the turbine wheel it is necessary to bring all pipes through the turbine bulkhead 2 near the outside shell. The fittings or nipples indicated at 28 and 29 near the top and bottom of the drawing are typical of the tubular connections through this bulkhead and the exhaust chamber.

The gear reduction between the turbine and the driven shaft is substantially in the ratio of 16 to 1 thus resulting in a propeller speed of 1200 revolutions per minute from a turbine speed of 19,200 revolutions per minute. This reduction takes place in two stages, each being a 4 to 1 ratio, the first occurring between the shaft 7 and the gear 10 and the second between the shaft 11 and the gear 14 for the inner shaft and the pinion 17 and the internal gear 18 for the other shaft.

As above stated the oiling of the gear train is accomplished by the injection of a certain amount of oil into the gear train housing. The lower gears will run in oil and supply the rest of the train by the splash system. This method of oiling materially saves in the oil consumption, eliminates the use of the oil pump and the oil tanks with a consequent saving of weight and material thus simplifying the construction and reducing the cost of assembling.

Further, by reason of the direct contact of the engine cage with the water through which the torpedo travels the temperature of the after-body is reduced and thereby eliminates to a considerable extent the hot exhaust from reaching the gear train and after-body and results in a more satisfactory performance of the immersion mechanism and the steering control.

It is thus seen the present invention provides a simple and practical mechanism which is reliable and efficient in use and operation and well adapted to accomplish, among others, all of the objects and advantages herein set forth.

What I claim is:—

1. In a torpedo, in combination, a water jacketed engine casing separated from the central and after-bodies by bulkheads and having its peripheral wall formed by the shell of the torpedo, a turbine mounted therein, a shaft driven thereby, propeller shafts and two sets of reduction gearing between the driving shaft and the driven shafts, said gearing including a relatively large internal gear driven in a direction opposite to the turbine thereby to reduce the gyroscopic action of the turbine and a casing enclosing said gearing provided with an oil inlet and outlet.

2. In a torpedo, in combination, a single turbine wheel, a shaft operable thereby, a stud shaft operable by the turbine shaft through a gearing, concentrically mounted propeller shafts, and reduction gearing connecting each of the propeller shafts with the stud shaft and rotating the propeller shafts in opposite directions.

3. In a torpedo, in combination, a single turbine wheel, a shaft operable thereby, a stud shaft operable by the turbine shaft through a gearing, concentrically mounted propeller shafts, and reduction gearing connecting each of the propeller shafts with the stud shaft, one of said gearing comprising a relatively large internal gear driven in a direction opposite to the turbine thereby to reduce the gyroscopic action of the turbine.

4. In a torpedo, in combination, a single turbine wheel, concentrically mounted propeller shafts rotatable in opposed directions, and a single shaft receiving motion from the turbine and imparting said opposed rotations to the propeller shafts through gearing directly connecting each of the propeller shafts with the single shaft.

Signed at Newport, Rhode Island, this 24th day of February, 1922.

JAMES S. CURRIER.